US012671048B2

(12) United States Patent
Horie et al.

(10) Patent No.: US 12,671,048 B2
(45) Date of Patent: Jun. 30, 2026

(54) ELECTROMAGNETIC RELAY WITH A MOVABLE PIECE INCLUDING CONTACT PORTIONS

(71) Applicant: OMRON Corporation, Kyoto (JP)

(72) Inventors: Ayata Horie, Kyoto (JP); Hiroyuki Iwasaka, Kyoto (JP); Ryota Minowa, Kyoto (JP); Shinichi Ogawa, Kyoto (JP); Kohei Otsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 248 days.

(21) Appl. No.: 18/684,819

(22) PCT Filed: Mar. 16, 2022

(86) PCT No.: PCT/JP2022/011804
§ 371 (c)(1),
(2) Date: Feb. 19, 2024

(87) PCT Pub. No.: WO2023/042443
PCT Pub. Date: Mar. 23, 2023

(65) Prior Publication Data
US 2024/0355566 A1 Oct. 24, 2024

(30) Foreign Application Priority Data
Sep. 17, 2021 (JP) ................................ 2021-152607

(51) Int. Cl.
*H01H 50/54* (2006.01)
*H01H 50/14* (2006.01)

(52) U.S. Cl.
CPC ............ *H01H 50/54* (2013.01); *H01H 50/14* (2013.01)

(58) Field of Classification Search
None
See application file for complete search history.

(56) References Cited

U.S. PATENT DOCUMENTS 5,004,874 A * 4/1991 Theisen ................. H01H 9/443 218/151
11,705,289 B2 * 7/2023 Friedrichsen ............ H01H 9/36 335/196

(Continued)

FOREIGN PATENT DOCUMENTS

JP S57-48541 U 3/1982
JP H9-161639 A 6/1997

(Continued)

OTHER PUBLICATIONS

International Search Report of International Application No. PCT/JP2022/011804 issued on May 24, 2022.

(Continued)

*Primary Examiner* — Bernard Rojas
(74) *Attorney, Agent, or Firm* — SHINJYU GLOBAL IP

(57) ABSTRACT

An electromagnetic relay includes a drive shaft, a drive device, a movable piece, a first fixed terminal, and a second fixed terminal. The drive shaft is movable in a moving direction. The drive shaft extends in the moving direction. The drive device moves the drive shaft in the moving direction. The movable piece includes a center portion connected to the drive shaft. The movable piece extends in a longitudinal direction. The first fixed terminal and the second fixed terminal face the movable piece. The movable piece includes a first contact portion and a second contact portion. The first contact portion contacts the first fixed terminal. The second contact portion contacts the second fixed terminal. The first contact portion is disposed eccentrically with respect to a center line of the movable piece. The center line of the movable piece extends in the longitudinal direction through the center portion.

15 Claims, 12 Drawing Sheets

(56) References Cited

U.S. PATENT DOCUMENTS

| | | | | |
|---|---|---|---|---|
| 12,183,529 | B2 * | 12/2024 | Minowa ................. | H01H 50/38 |
| 2011/0241809 | A1 | 10/2011 | Sugisawa et al. | |
| 2012/0235775 | A1 | 9/2012 | Sugisawa et al. | |
| 2012/0256713 | A1 | 10/2012 | Sugisawa et al. | |
| 2019/0013171 | A1 | 1/2019 | Minowa et al. | |
| 2021/0090836 | A1 | 3/2021 | Otsuka et al. | |

FOREIGN PATENT DOCUMENTS

| | | | |
|---|---|---|---|
| JP | 2011-228245 | A | 11/2011 |
| JP | 2017-195161 | A | 10/2017 |
| JP | 2021-48092 | A | 3/2021 |
| KR | 10-2017-0139398 | A | 12/2017 |

OTHER PUBLICATIONS

Written Opinion of the International Searching Authority of International Application No. PCT/JP2022/011804 issued on May 24, 2022.

* cited by examiner

ELECTROMAGNETIC RELAY WITH A MOVABLE PIECE INCLUDING CONTACT PORTIONS

CROSS-REFERENCE TO RELATED APPLICATION

This application is the U.S. National Phase of International Application No. PCT/JP2022/011804, filed on Mar. 16, 2022, the priority benefit of which is claimed. That application claims priority to Japanese Patent Application No. 2021-152607, filed Sep. 17, 2021, the priority benefit of which is claimed. The contents of both those applications are incorporated by reference herein in their entireties.

FIELD

The claimed invention relates to an electromagnetic relay.

BACKGROUND

There is a type of electromagnetic relay called a plunger type. The plunger type electromagnetic relay includes a movable piece, a first movable contact, a second movable contact, a drive shaft, a coil, and a movable iron core (see, for example, Japanese Patent Application Publication No. 2021-48092). The first and second movable contacts are arranged apart from each other in the longitudinal direction of the movable piece and are connected to the movable piece. The drive shaft is connected to the center of the movable piece. The drive shaft extends in the moving direction of the movable piece. The drive shaft is connected to the movable iron core. The movable piece moves as the movable iron core moves due to the magnetic force of the coil.

SUMMARY

In the plunger type electromagnetic relay described above, the center of the first movable contact and the center of the second movable contact are arranged on the center line of the movable piece. In this case, a repulsive force generated by the short-circuit current acts on the movable piece in a direction parallel to the moving direction of the movable piece and in which the contacts are separated. Therefore, the contact force required to bring the contacts into stable contact increases. This results in an increase in the size of the drive device. An object of the claimed invention is to improve the short circuit resistance of an electromagnetic relay while suppressing an increase in size of a drive device.

An electromagnetic relay according to an aspect of the claimed invention includes a drive shaft, a drive device, a movable piece, a first fixed terminal, and a second fixed terminal. The drive shaft is movable in a moving direction. The drive shaft extends in the moving direction. The drive device moves the drive shaft in the moving direction. The movable piece includes a center portion connected to the drive shaft. The movable piece extends in a longitudinal direction. The first fixed terminal faces the movable piece. The second fixed terminal faces the movable piece and is spaced apart from the first fixed terminal in the longitudinal direction. The movable piece includes a first contact portion and a second contact portion. The first contact portion contacts the first fixed terminal. The second contact portion contacts the second fixed terminal. The first contact portion is eccentrically arranged (i.e., laterally offset) with respect to a center line of the movable piece. The center line of the movable piece extends in the longitudinal direction through the center portion.

In the electromagnetic relay according to the present aspect, the first contact portion is arranged eccentrically with respect to the center line of the movable piece that extends in the longitudinal direction through the center portion. Therefore, the repulsive force generated by the short-circuit current acts on the movable piece obliquely with respect to the moving direction of the movable piece. This reduces the repulsive force in the direction in which the first contact portion separates. Therefore, in the electromagnetic relay according to the present aspect, the short circuit resistance of the electromagnetic relay is improved while suppressing the increase in size of the drive device.

The second contact portion may be arranged eccentrically (i.e., laterally offset) with respect to the center line of the movable piece. In this case, the repulsive force in the direction in which the second contact portion separates is reduced. Thereby, the short circuit resistance of the electromagnetic relay is improved while suppressing the increase in size of the drive device.

The first contact portion and the second contact portion may be eccentric toward opposite sides with respect to the center line. In this case, the repulsive force acting on the first contact portion and the repulsive force acting on the second contact portion act obliquely in opposite directions. Therefore, the repulsive forces in the direction of tilting the movable piece are mutually canceled out. Thereby, the movable piece can be moved stably.

The first contact portion and the second contact portion may be arranged point-symmetrically with respect to the center portion. In this case, the movable piece can be moved more stably.

The movable piece may include a first notch. The first notch may be disposed adjacent to the first contact portion. In this case, the first notch reduces a portion of the movable piece through which current flows. As a result, the repulsive force at the portion where the first notch is provided becomes smaller, so that the repulsive force acts obliquely with respect to the moving direction of the movable piece.

The movable piece may include a second notch. The second notch may be disposed adjacent to the second contact portion. In this case, the second notch reduces a portion of the movable piece through which current flows. As a result, the repulsive force at the portion where the second notch is provided becomes smaller, so that the repulsive force acts obliquely with respect to the moving direction of the movable piece.

The first notch and the second notch may be arranged point-symmetrically with respect to the center portion. In this case, the movable piece can be moved stably.

The first fixed terminal may include a third notch. The third notch may be disposed adjacent to the first notch. In this case, the third notch reduces a portion of the first fixed terminal through which current flows. As a result, the repulsive force at the portion where the third notch is provided becomes smaller, so that the repulsive force acts obliquely with respect to the moving direction of the movable piece.

The second fixed terminal may include a fourth notch. The fourth notch may be disposed adjacent to the second notch. The fourth notch reduces a portion of the second fixed terminal through which current flows. As a result, the repulsive force at the portion where the fourth notch is provided becomes smaller, so that the repulsive force acts obliquely with respect to the moving direction of the movable piece.

The movable piece may include a first recess. The first recess may be disposed adjacent to the first contact portion. In this case, the first recess reduces a portion of the movable piece through which current flows. As a result, the repulsive force at the portion where the first recess is provided becomes smaller, so that the repulsive force acts obliquely with respect to the moving direction of the movable piece.

The movable piece may include a second recess. The second recess may be disposed adjacent to the second contact portion. In this case, the second recess reduces a portion of the movable piece through which current flows. As a result, the repulsive force at the portion where the second recess is provided becomes smaller, so that the repulsive force acts obliquely with respect to the moving direction of the movable piece.

The first recess and the second recess may be disposed point-symmetrically with respect to the center portion. In this case, the movable piece can be moved stably.

The first contact portion may include a first contact surface inclined with respect to the surface of the movable piece. In this case, since the first contact surface is inclined, the repulsive force generated by the short-circuit current acts on the movable piece obliquely with respect to the moving direction of the movable piece. This reduces the repulsive force in the direction in which the first contact portion separates.

The second contact portion may include a second contact surface inclined with respect to the surface of the movable piece. In this case, since the second contact surface is inclined, the repulsive force generated by the short-circuit current acts on the movable piece obliquely with respect to the moving direction of the movable piece. This reduces the repulsive force in the direction in which the second contact portion separates.

The first contact surface and the second contact surface may be inclined in opposite directions with respect to the center line. In this case, the repulsive force acting on the first contact portion and the repulsive force acting on the second contact portion act obliquely in opposite directions. Therefore, the repulsive forces in the direction of tilting the movable piece are mutually canceled out. Thereby, the movable piece can be moved stably.

DETAILED DESCRIPTION

Figure 1:
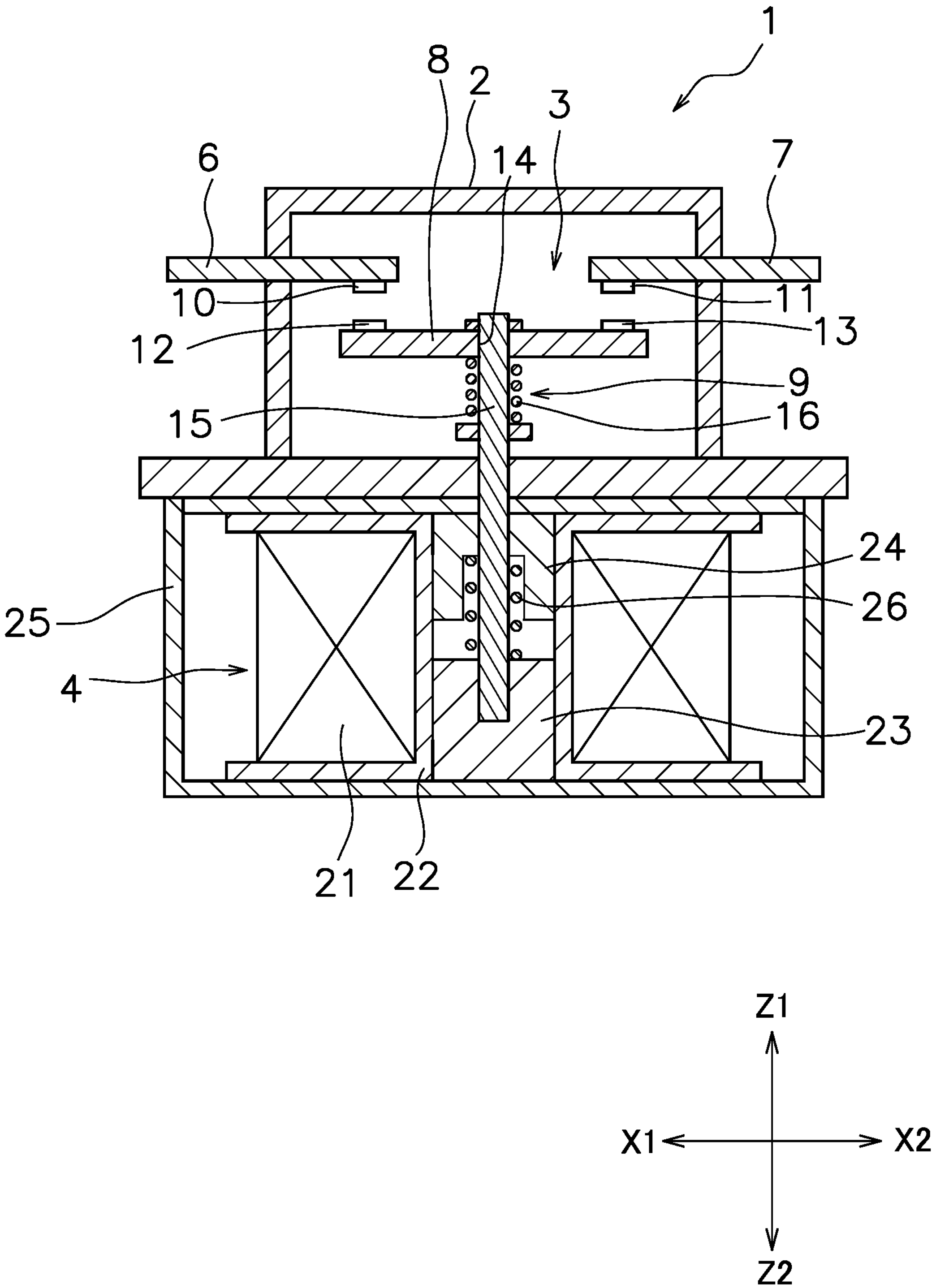
FIG. 1 is a sectional view of an electromagnetic relay in an open state.

Hereinafter, an electromagnetic relay according to an embodiment of the claimed invention will be described with reference to the drawings. FIG. 1 is a sectional view of an electromagnetic relay 1 according to an embodiment. As shown in FIG. 1, the electromagnetic relay 1 includes a case 2, a contact device 3, and a drive device 4. The case 2 is made of an insulating material such as resin or ceramic. The contact device 3 is housed within the case 2. The contact device 3 includes a first fixed terminal 6, a second fixed terminal 7, a movable piece 8, a movable mechanism 9, a first fixed contact 10, a second fixed contact 11, a first movable contact 12, and a second movable contact 13.

In addition, in the following description, the direction in which the first fixed contact 10 and the first movable contact 12 face each other is defined as a moving direction (Z1, Z2). The moving direction (Z1, Z2) includes a contact direction (Z1) and a separation direction (Z2). The direction in which the movable contacts 12 and 13 approach the fixed contacts 10 and 11 is defined as the contact direction (Z1). The direction in which the movable contacts 12 and 13 move away from the fixed contacts 10 and 11 is defined as the separation direction (Z2).

The direction in which the movable piece 8 extends is defined as a longitudinal direction (X1, X2). The longitudinal direction (X1, X2) is a direction perpendicular to the moving direction (Z1, Z2). The longitudinal direction (X1, X2) includes a first longitudinal direction (X1) and a second longitudinal direction (X2). The second longitudinal direction (X2) is the opposite direction to the first longitudinal direction (X1). The direction from the second fixed contact 11 toward the first fixed contact 10 is defined as the first longitudinal direction (X1). The direction from the first fixed contact 10 to the second fixed contact 11 is defined as the second longitudinal direction (X2).

Figure 3:
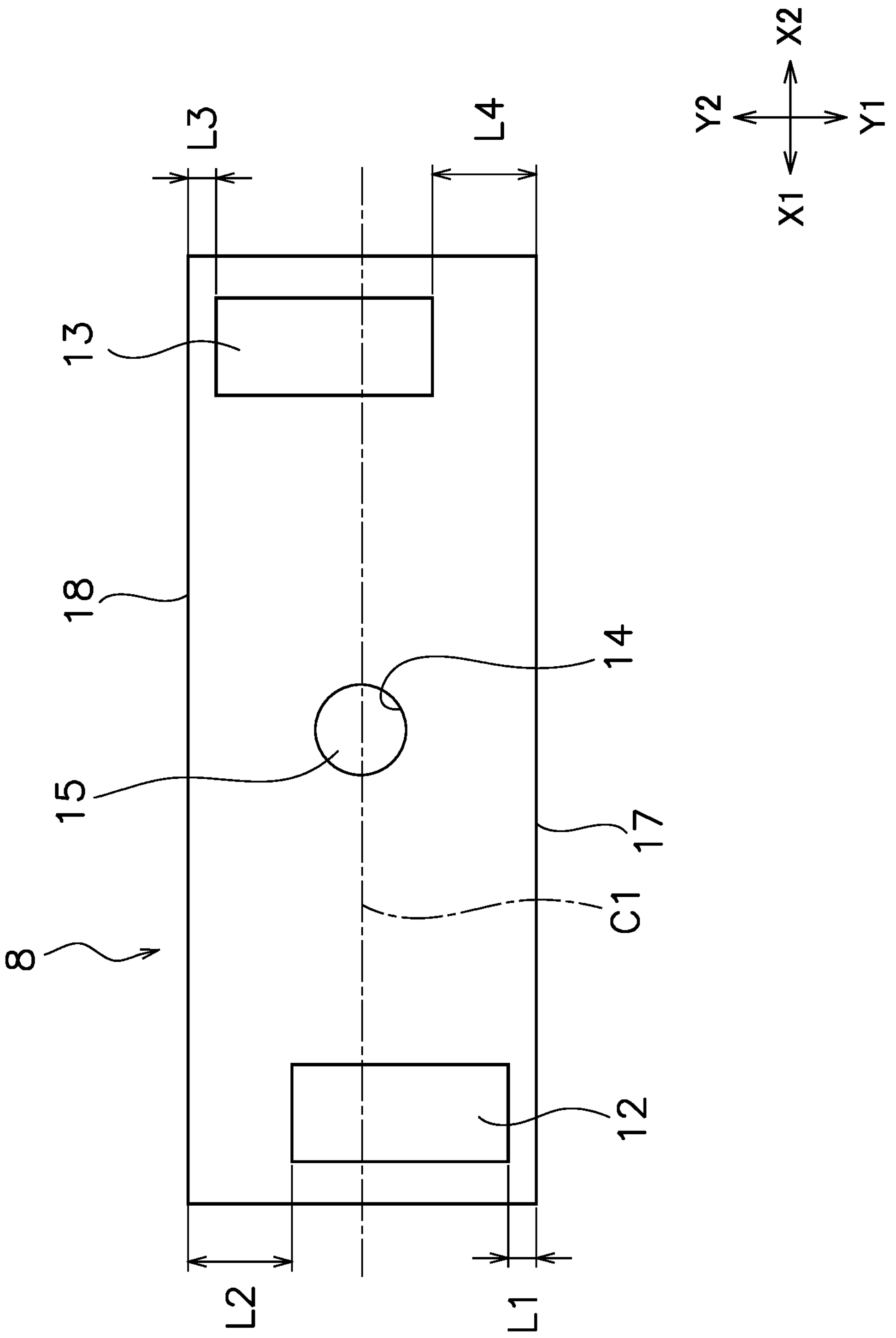
FIG. 3 is a top view of a movable piece and a movable contact.

As shown in FIG. 3, the direction orthogonal to the moving direction (Z1, Z2) and the longitudinal direction (X1, X2) is defined as a lateral direction (Y1, Y2). The lateral direction (Y1, Y2) includes a first lateral direction (Y1) and a second lateral direction (Y2). The second lateral direction (Y2) is a direction opposite to the first lateral direction (Y1).

The first fixed terminal 6, the second fixed terminal 7, the movable piece 8, the first fixed contact 10, the second fixed contact 11, the first movable contact 12, and the second movable contact 13 are made of electrically conductive materials. For example, the first fixed terminal 6, the second fixed terminal 7, and the movable piece 8 are made of a metal material known as a terminal material such as copper-based metal. However, the first fixed terminal 6, the second fixed terminal 7, and the movable piece 8 may be made of materials different from these materials. The first fixed contact 10, the second fixed contact 11, the first movable contact 12, and the second movable contact 13 are made of a metal material known as a contact material such as a copper-based metal or a silver-based metal.

The first fixed terminal 6 and the second fixed terminal 7 are disposed apart from each other in the longitudinal direction (X1, X2). The first fixed terminal 6 and the second fixed terminal 7 extend from inside the case 2 to the outside of the case 2. The first fixed contact 10 is connected to the first fixed terminal 6. The second fixed contact 11 is connected to the second fixed terminal 7. The first fixed contact 10 and the second fixed contact 11 are disposed inside the case 2.

The movable piece 8, the first movable contact 12, and the second movable contact 13 are disposed inside the case 2. The first movable contact 12 and the second movable contact 13 are connected to the movable piece 8. The first movable contact 12 faces the first fixed contact 10. The second movable contact 13 faces the second fixed contact 11. The first movable contact 12 is disposed apart from the second movable contact 13 in the longitudinal direction (X1, X2).

Figure 2:
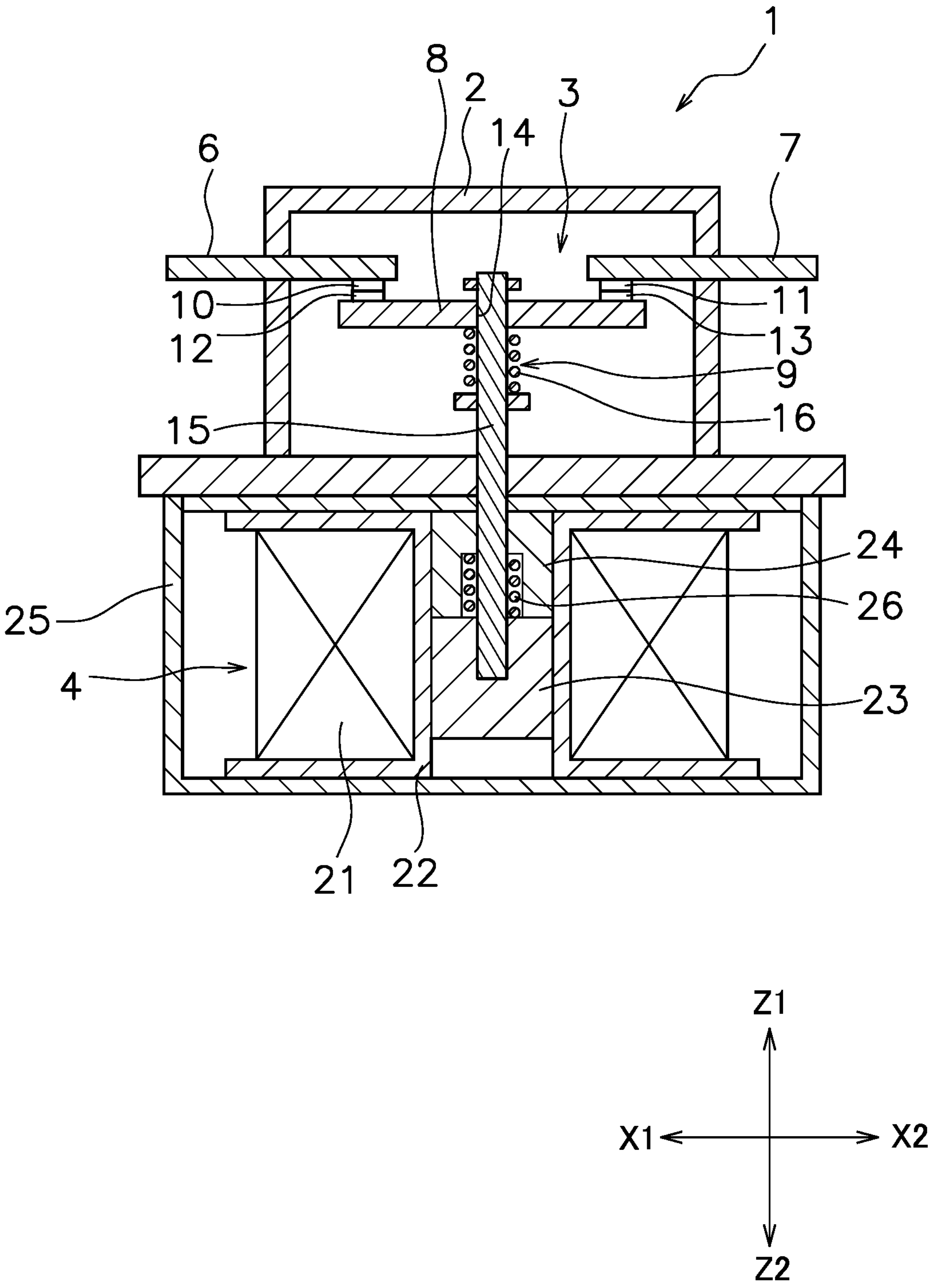
FIG. 2 is a sectional view of the electromagnetic relay in a closed state.

The movable piece 8 is movable in the moving direction (Z1, Z2). The movable piece 8 is movable between an open position shown in FIG. 1 and a closed position shown in FIG. 2. As shown in FIG. 1, when the movable piece 8 is at the open position, the movable contacts 12 and 13 are separated from the fixed contacts 10 and 11. As shown in FIG. 2, when the movable piece 8 is at the closed position, the movable contacts 12 and 13 are in contact with the fixed contacts 10 and 11.

The movable mechanism 9 supports the movable piece 8. The movable mechanism 9 includes a drive shaft 15 and a contact spring 16. The drive shaft 15 is connected to the movable piece 8. The drive shaft 15 extends in the moving direction (Z1, Z2) through the movable piece 8 in the moving direction (Z1, Z2). The drive shaft 15 is movable in the moving direction (Z1, Z2). The contact spring 16 urges the movable piece 8 toward the contact direction (Z1).

FIG. 3 is a top view of the movable piece 8 and the movable contacts 12 and 13. As shown in FIG. 3, the movable piece 8 includes a center portion 14. The center portion 14 is located at the center of the movable piece 8 in the longitudinal direction (X1, X2). The center portion 14 is located at the center of the movable piece 8 in the lateral direction (Y1, Y2). The center portion 14 of the movable piece 8 is connected to the drive shaft 15. The center portion 14 is provided with a hole through which the drive shaft 15 passes. A center line C1 of the movable piece 8 extends in the longitudinal direction (X1, X2) through the center portion 14.

The first movable contact 12 and the second movable contact 13 are eccentric (i.e., laterally offset) toward opposite sides with respect to the center line C1. That is, in the lateral direction (Y1, Y2), the center of the first movable contact 12 is shifted from the center line C1. In the lateral direction (Y1, Y2), the center of the second movable contact 13 is shifted from the center line C1. Specifically, the first movable contact 12 is eccentric in the first lateral direction (Y1) with respect to the center line C1. The second movable contact 13 is eccentric in the second lateral direction (Y2) with respect to the center line C1. The first movable contact 12 and the second movable contact 13 are disposed point-symmetrically with respect to the center portion 14.

As seen from the moving direction (Z1, Z2), the first movable contact 12 overlaps the center line C1. As seen from the moving direction (Z1, Z2), the second movable contact 13 overlaps the center line C1. The movable piece 8 includes a first edge 17 and a second edge 18. The first edge 17 is an edge of the movable piece 8 in the first lateral direction (Y1). The second edge 18 is an edge of the movable piece 8 in the second lateral direction (Y2). The first edge 17 and the second edge 18 extend in the longitudinal direction (X1, X2).

The first movable contact 12 is disposed closer to the first edge 17 than the second edge 18. The second movable contact 13 is disposed closer to the second edge 18 than the first edge 17. In the lateral direction (Y1, Y2), the distance L2 between the first movable contact 12 and the second edge 18 is larger than the distance L1 between the first movable contact 12 and the first edge 17. In the lateral direction (Y1, Y2), the distance L4 between the second movable contact 13 and the first edge 17 is larger than the distance L3 between the second movable contact 13 and the second edge 18.

As shown in FIGS. 1 and 2, the drive device 4 moves the drive shaft 15 in the moving direction (Z1, Z2). The drive device 4 includes a coil 21, a spool 22, a movable iron core 23, a fixed iron core 24, a yoke 25, and a return spring 26. The drive device 4 moves the movable piece 8 between the open position and the closed position via the movable mechanism 9 using electromagnetic force. The coil 21 is wound around the spool 22. The movable iron core 23 and the fixed iron core 24 are disposed within the spool 22. The movable iron core 23 is connected to the drive shaft 15. The movable iron core 23 is movable in the moving direction (Z1, Z2). The fixed iron core 24 is disposed facing the movable iron core 23. The return spring 26 urges the movable iron core 23 in the separation direction (Z2).

In the electromagnetic relay 1, when the coil 21 is energized, the movable iron core 23 is attracted to the fixed iron core 24 by the magnetic force of the coil 21. Thereby, the movable iron core 23 and the drive shaft 15 move in the contact direction (Z1) against the urging force of the return spring 26. Thereby, the movable piece 8 moves to the closed position shown in FIG. 2, and the movable contacts 12 and 13 come into contact with the fixed contacts 10 and 11. Note that after the movable contacts 12 and 13 contact the fixed contacts 10 and 11, the drive shaft 15 further moves in the contact direction (Z1), thereby compressing the contact spring 16.

When the coil 21 is de-energized, the movable iron core 23 and the drive shaft 15 are moved in the separation direction (Z2) by the urging force of the return spring 26. Thereby, the movable piece 8 moves to the open position shown in FIG. 1, and the movable contacts 12 and 13 separate from the fixed contacts 10 and 11.

Figure 4:
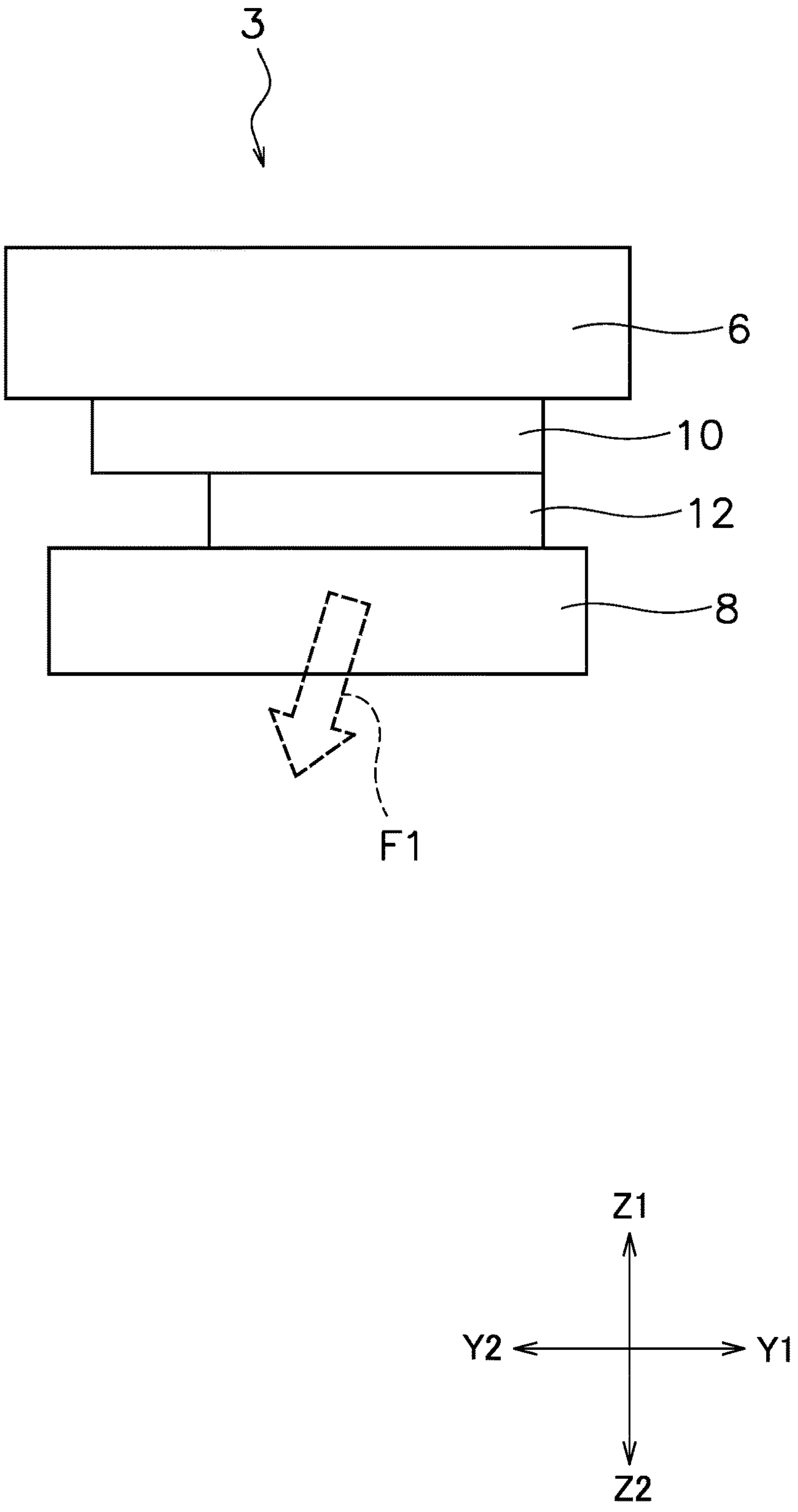
FIG. 4 is a diagram showing a contact device as seen from a longitudinal direction of the movable piece.

In the electromagnetic relay 1 according to the present embodiment described above, the first movable contact 12 and the second movable contact 13 are eccentrically disposed with respect to the center line C1 of the movable piece 8. FIG. 4 is a diagram showing the contact device 3 as seen from the longitudinal direction (X1, X2). As shown in FIG. 4, the first movable contact 12 and the second movable contact 13 are disposed eccentrically on the movable piece, so that the repulsive force F1 generated by the short-circuit current acts on the movable piece 8 obliquely with respect to the moving direction (Z1, Z2) of the movable piece 8. Thereby, the repulsive force in the separation direction (Z2) is reduced compared to the case where the repulsive force acts in a direction parallel to the moving direction (Z1, Z2). Therefore, in the electromagnetic relay 1, the short circuit resistance of the electromagnetic relay 1 is improved while suppressing the increase in size of the drive device 4.

Although one embodiment of the claimed invention has been described above, the claimed invention is not limited to the above embodiment, and various changes can be made without departing from the scope of the invention.

The structure of the drive device 4 is not limited to that of the above embodiment, and may be modified. For example, in the embodiment described above, the drive device 4 is disposed in the opening direction (Z2) of the contact device 3. However, the drive device 4 may be disposed in the longitudinal direction (X1, X2) or in the lateral direction (Y1, Y2) with respect to the contact device 3. The separation direction (Z2) and the contact direction (Z1) may be opposite directions to those in the above embodiment.

The structure of the contact device 3 is not limited to that of the above embodiment, and may be modified. For example, the first fixed contact 10 may be provided separately from the first fixed terminal 6, or may be integrated with the first fixed terminal 6. The second fixed contact 11 may be provided separately from the second fixed terminal 7, or may be integrated with the second fixed terminal 7. The first movable contact 12 may be provided separately from the movable piece 8, or may be integrated with the movable piece 8. The second movable contact 13 may be provided separately from the movable piece 8, or may be integrated with the movable piece 8. The first fixed contact 10 and the second fixed contact 11 may be omitted. The first movable contact 12 as a distinct, separate component and the second movable contact 13 as a distinct, separate component may be omitted. In other words, the movable piece 8 may directly contact the first fixed terminal 6 and the second fixed terminal 7. That is, the first contact portion and the second contact portion of the movable piece 8 are not limited to the first movable contact 12 and the second movable contact 13, but may be parts of the movable piece 8.

Figure 5:
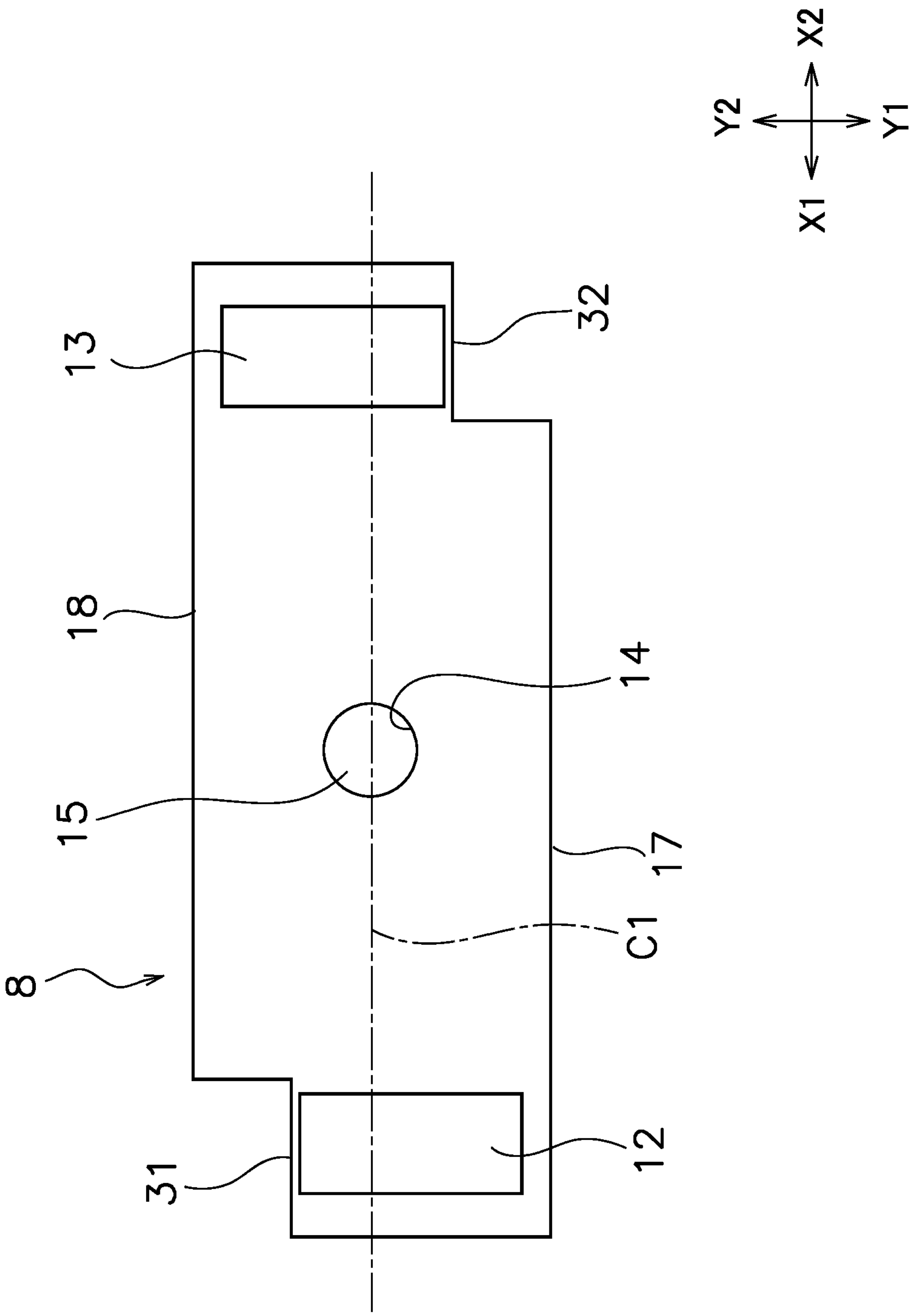
FIG. 5 is a top view showing a movable piece and a movable contact according to a first modification.

The structure of the movable piece 8 is not limited to that of the above embodiment, and may be modified. For example, FIG. 5 is a top view showing the movable piece 8 and movable contacts 12 and 13 according to the first modification. As shown in FIG. 5, the movable piece 8 may include a first notch 31 and a second notch 32.

The first notch 31 may be disposed adjacent to the first movable contact 12. The first notch 31 may be located in the second lateral direction (Y2) with respect to the first movable contact 12. The second notch 32 may be disposed adjacent to the second movable contact 13. The second notch 32 may be located in the first lateral direction (Y1) with respect to the second movable contact 13. The first notch 31 and the second notch 32 may be disposed point-symmetrically with respect to the center portion 14.

In the movable piece 8 according to the first modification, the first notch 31 and the second notch 32 reduce the portion through which current flows. As a result, the repulsive force at the portion where the first notch 31 and the second notch 32 are provided becomes smaller, so that the repulsive force acts diagonally to the moving direction (Z1, Z2) of the movable piece 8.

Figure 6:
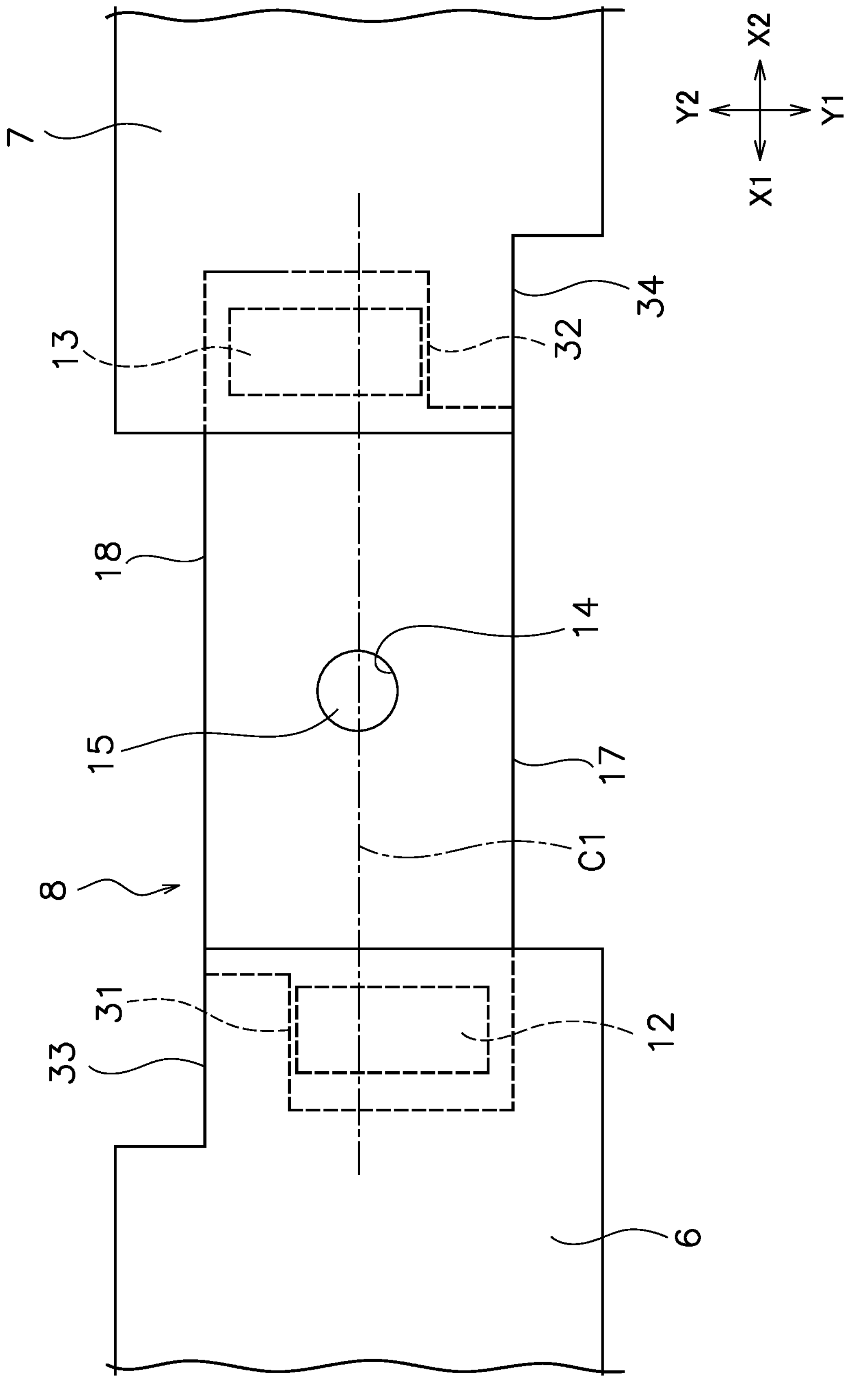
FIG. 6 is a top view showing a movable piece, a movable contact, and a fixed terminal according to a second modification.

FIG. 6 is a top view showing the movable piece 8, the movable contacts 12 and 13, and the fixed terminals 6 and 7 according to the second modification. As shown in FIG. 6, the first fixed terminal 6 may include a third notch 33. The third notch 33 may be disposed adjacent to the first notch 31. The third notch 33 may be disposed in the second lateral direction (Y2) with respect to the first notch 31. The second fixed terminal 7 may include a fourth notch 34. The fourth notch 34 may be disposed adjacent to the second notch 32. The fourth notch 34 may be disposed in the first lateral direction (Y1) with respect to the second notch 32.

In the movable piece 8 according to the second modification, the third notch 33 reduces a portion of the first fixed terminal 6 through which current flows. Furthermore, the fourth notch 34 reduces a portion of the second fixed terminal 7 through which current flows. As a result, the repulsive force at the portion where the third notch 33 and the fourth notch 34 are provided becomes smaller, so that the repulsive force acts diagonally to the moving direction (Z1, Z2) of the movable piece 8.

Figure 7:
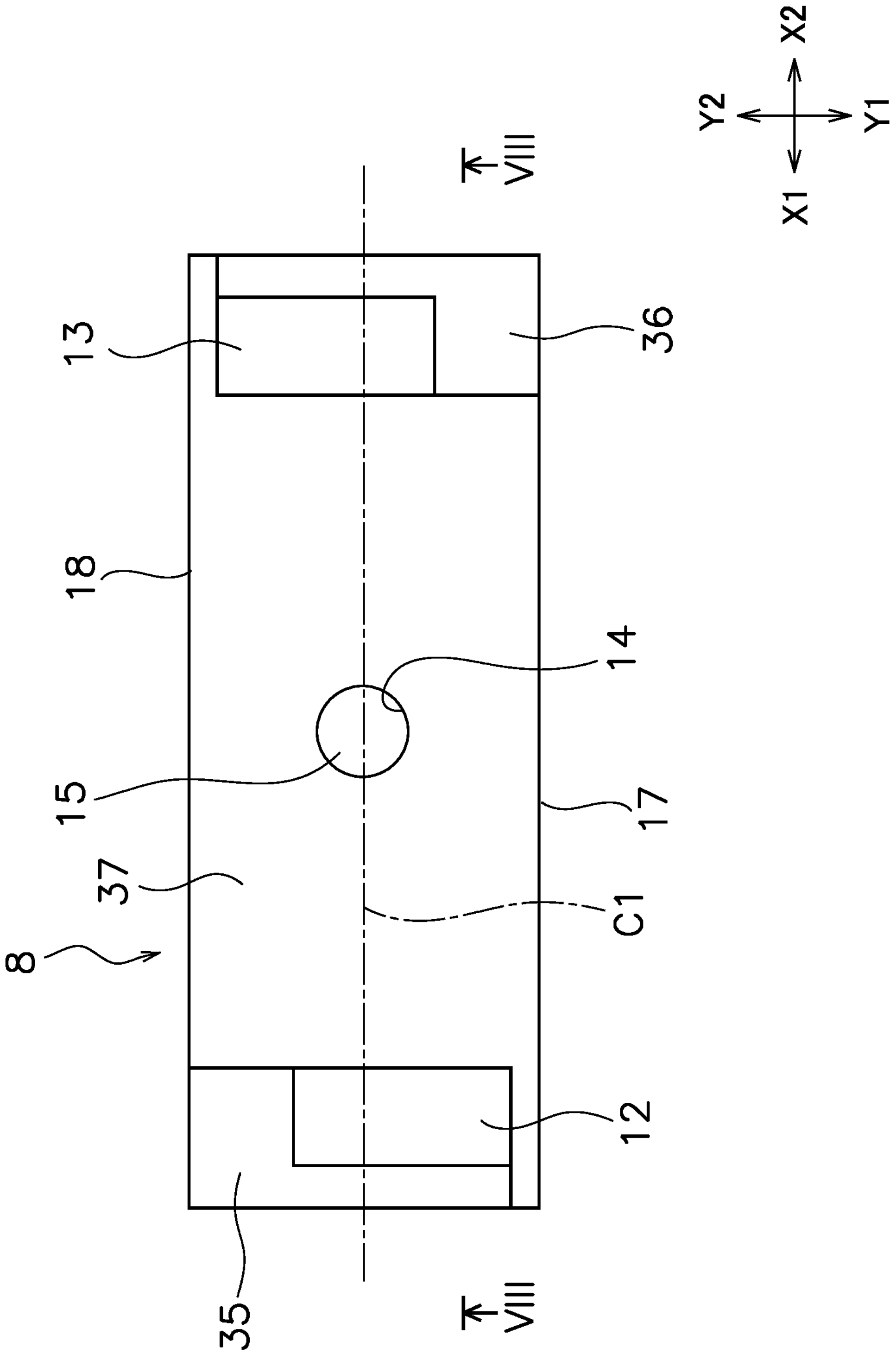
FIG. 7 is a top view showing a movable piece and a movable contact according to a third modification.
Figure 8:
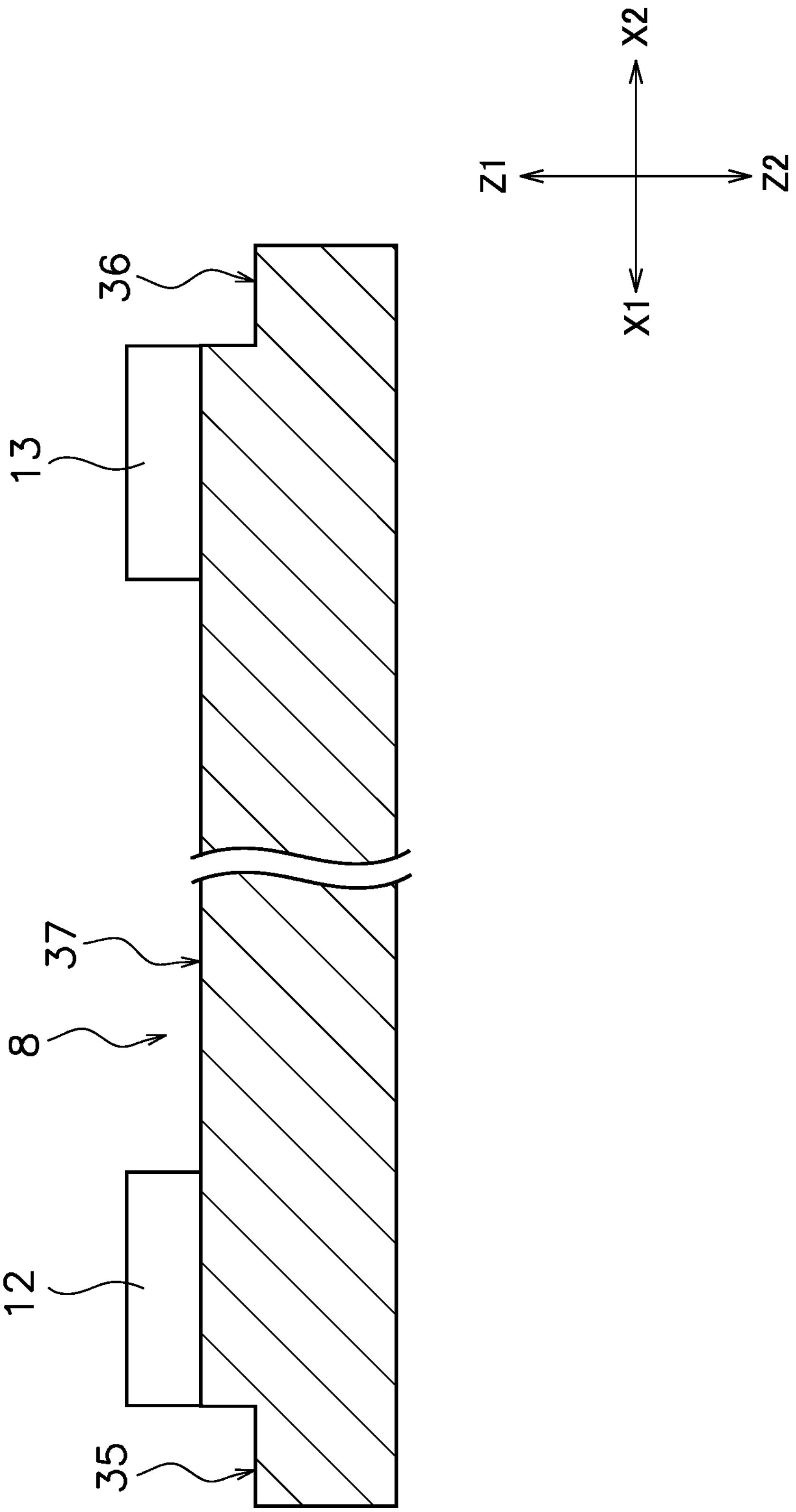
FIG. 8 is a sectional view taken along line VIII-VIII in FIG. 7.

FIG. 7 is a top view showing the movable piece 8 and the movable contacts 12 and 13 according to a third modification. FIG. 8 is a sectional view taken along line VIII-VIII in FIG. 7. As shown in FIGS. 7 and 8, the movable piece 8 may include a first recess 35 and a second recess 36. The first recess 35 and the second recess 36 may have a shape recessed from the surface 37 of the movable piece 8. The first recess 35 may be disposed adjacent to the first movable contact 12. The first recess 35 may be provided between the first movable contact 12 and the second edge 18.

The second recess 36 may be disposed adjacent to the second movable contact 13. The second recess 36 may be provided between the second movable contact 13 and the first edge 17. The first recess 35 and the second recess 36 may be disposed point-symmetrically with respect to the center portion 14. In the movable piece 8 according to the third modification, the first recess 35 and the second recess 36 reduce the area through which current flows. As a result, the repulsive force at the portion where the first recess 35 and the second recess 36 are provided becomes smaller, so that the repulsive force acts obliquely with respect to the moving direction (Z1, Z2) of the movable piece 8.

Figure 9:
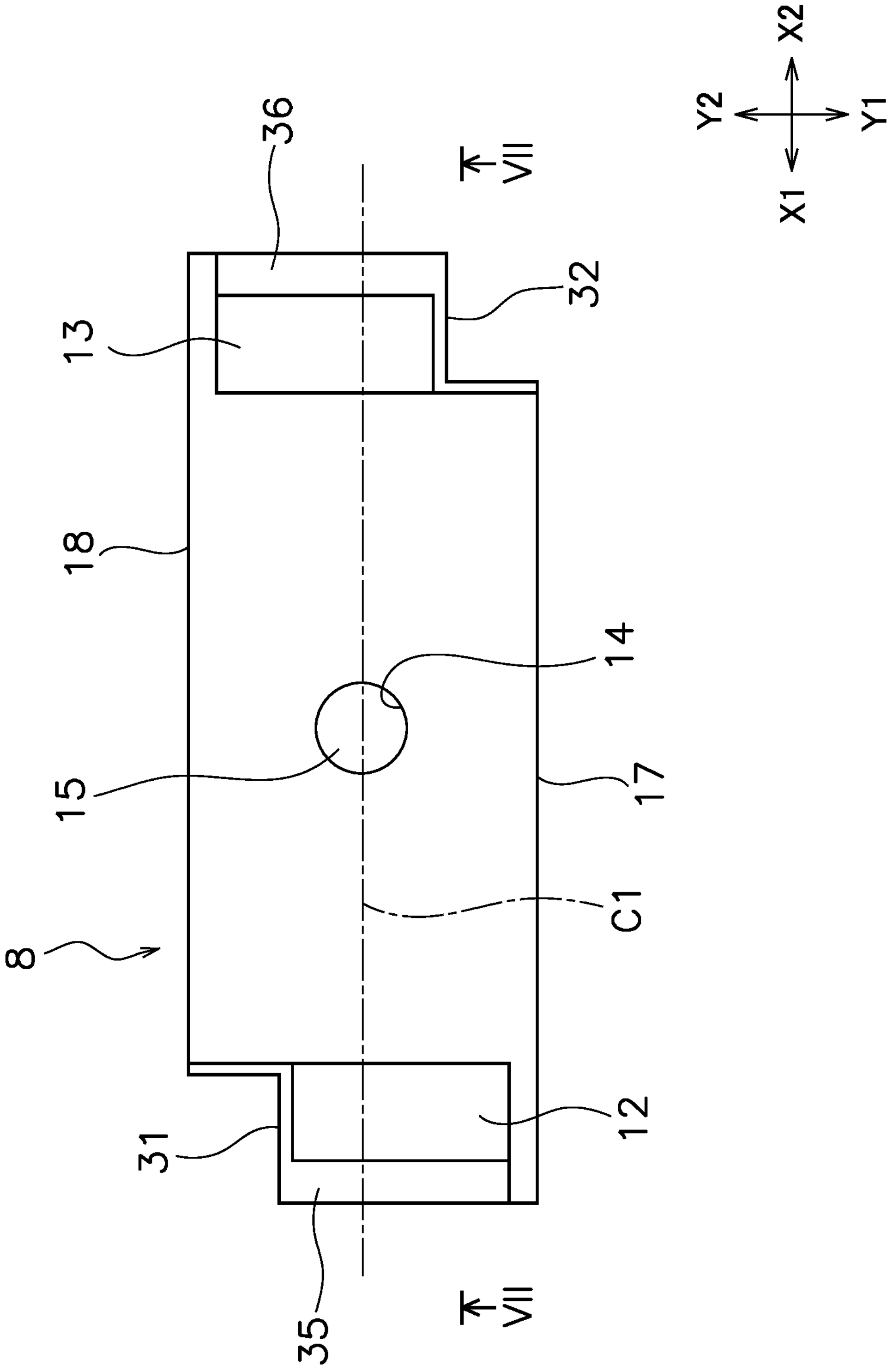
FIG. 9 is a top view showing a movable piece and a movable contact according to a fourth modification.

FIG. 9 is a top view showing the movable piece 8 and the movable contacts 12 and 13 according to a fourth modification. As shown in FIG. 9, the movable piece 8 may include the first notch 31, the second notch 32, the first recess 35, and the second recess 36 described above.

Figure 10:
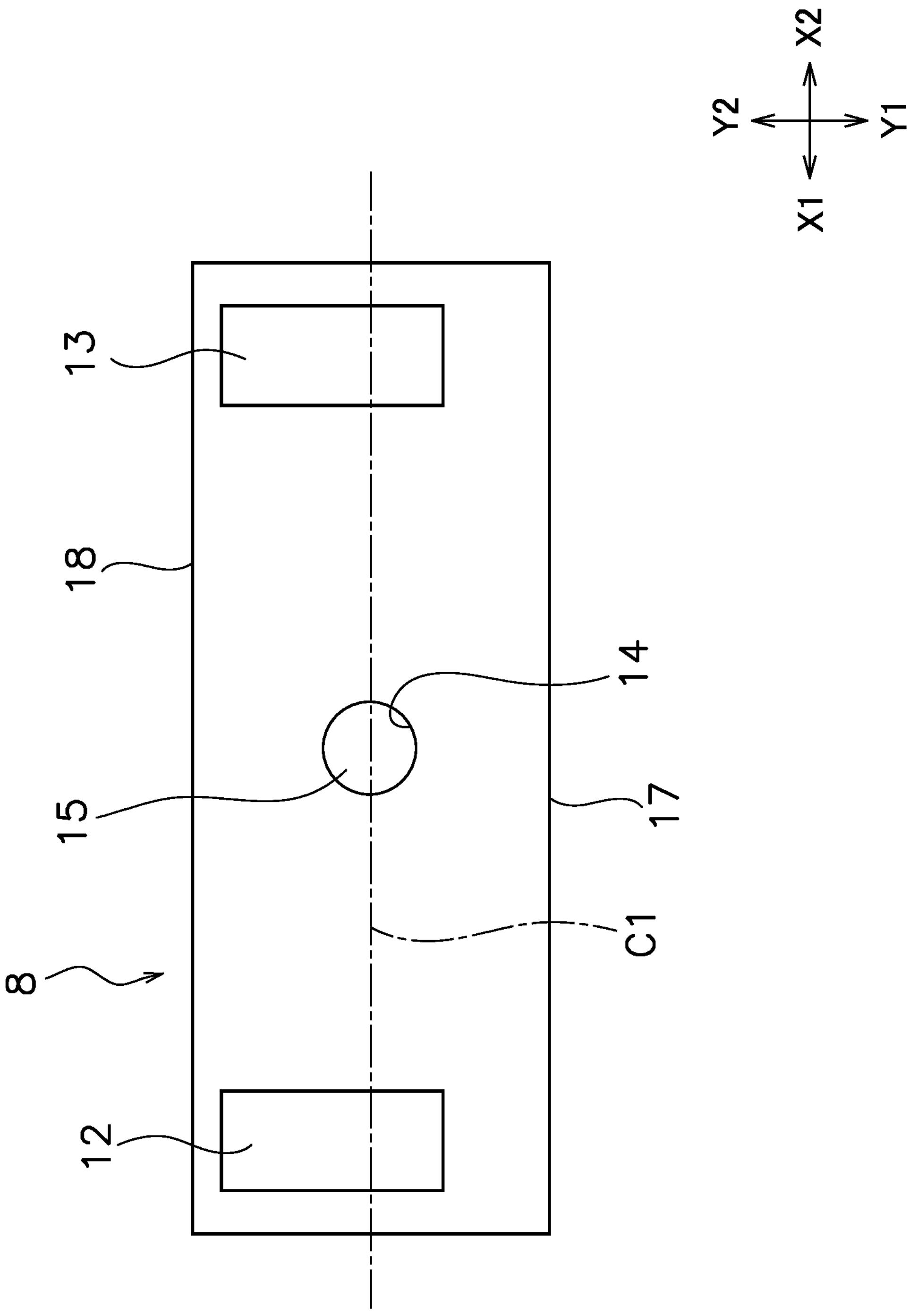
FIG. 10 is a top view showing a movable piece and a movable contact according to a fifth modification.

FIG. 10 is a top view showing the movable piece 8 and the movable contacts 12 and 13 according to a fifth modification. As shown in FIG. 10, the first movable contact 12 and the second movable contact 13 may be eccentric (i.e., laterally offset) in the same direction with respect to the center line C1. For example, both the first movable contact 12 and the second movable contact 13 may be eccentric in the second lateral direction (Y2) with respect to the center line C1. Alternatively, both the first movable contact 12 and the second movable contact 13 may be eccentric in the first lateral direction (Y1) with respect to the center line C1. Also in the above-mentioned modification, the first movable contact 12 and the second movable contact 13 may be eccentric in the same direction with respect to the center line C1, similarly to the fifth modification.

Figure 11:
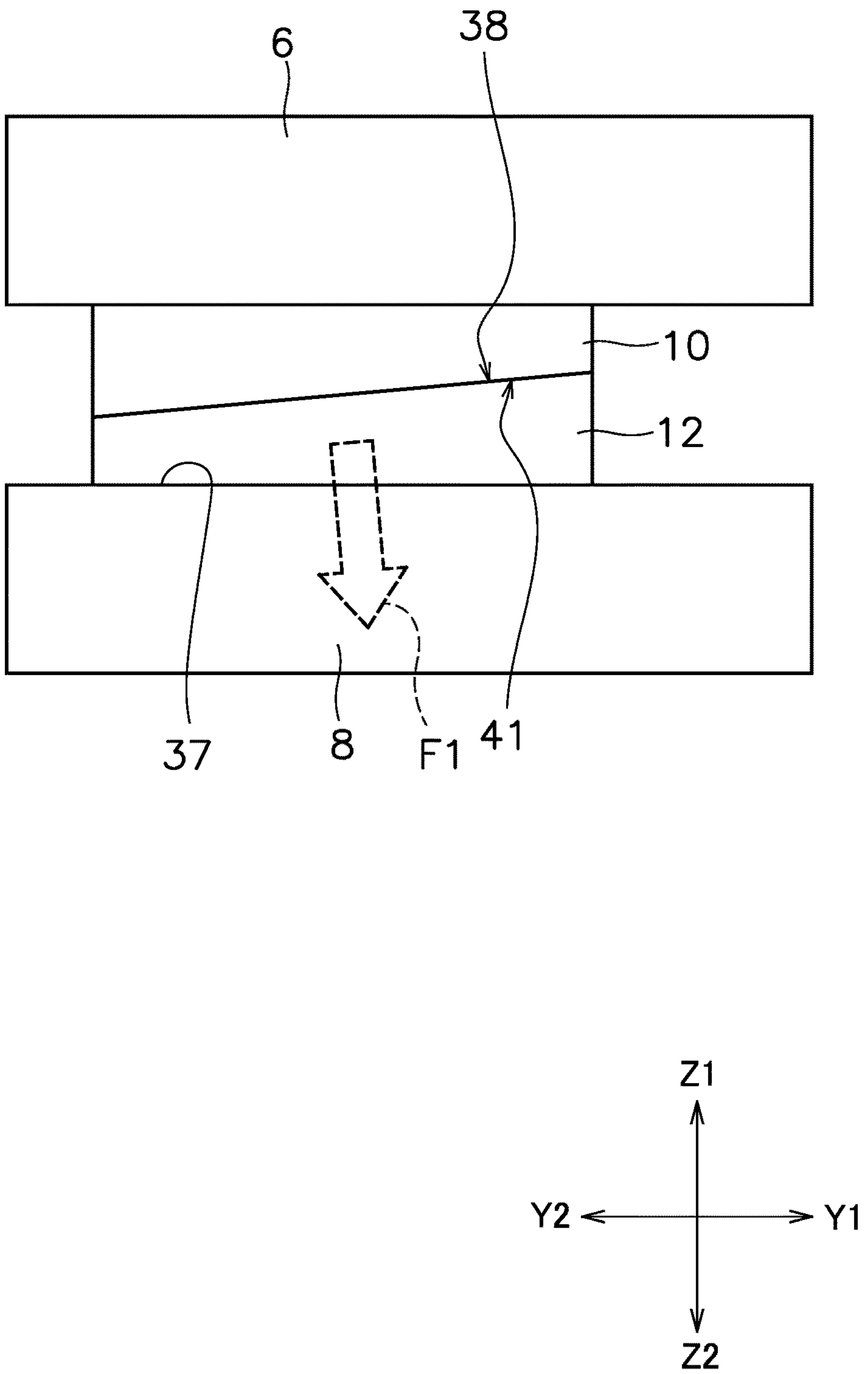
FIG. 11 is a left side view showing a contact device according to a sixth modification.
Figure 12:
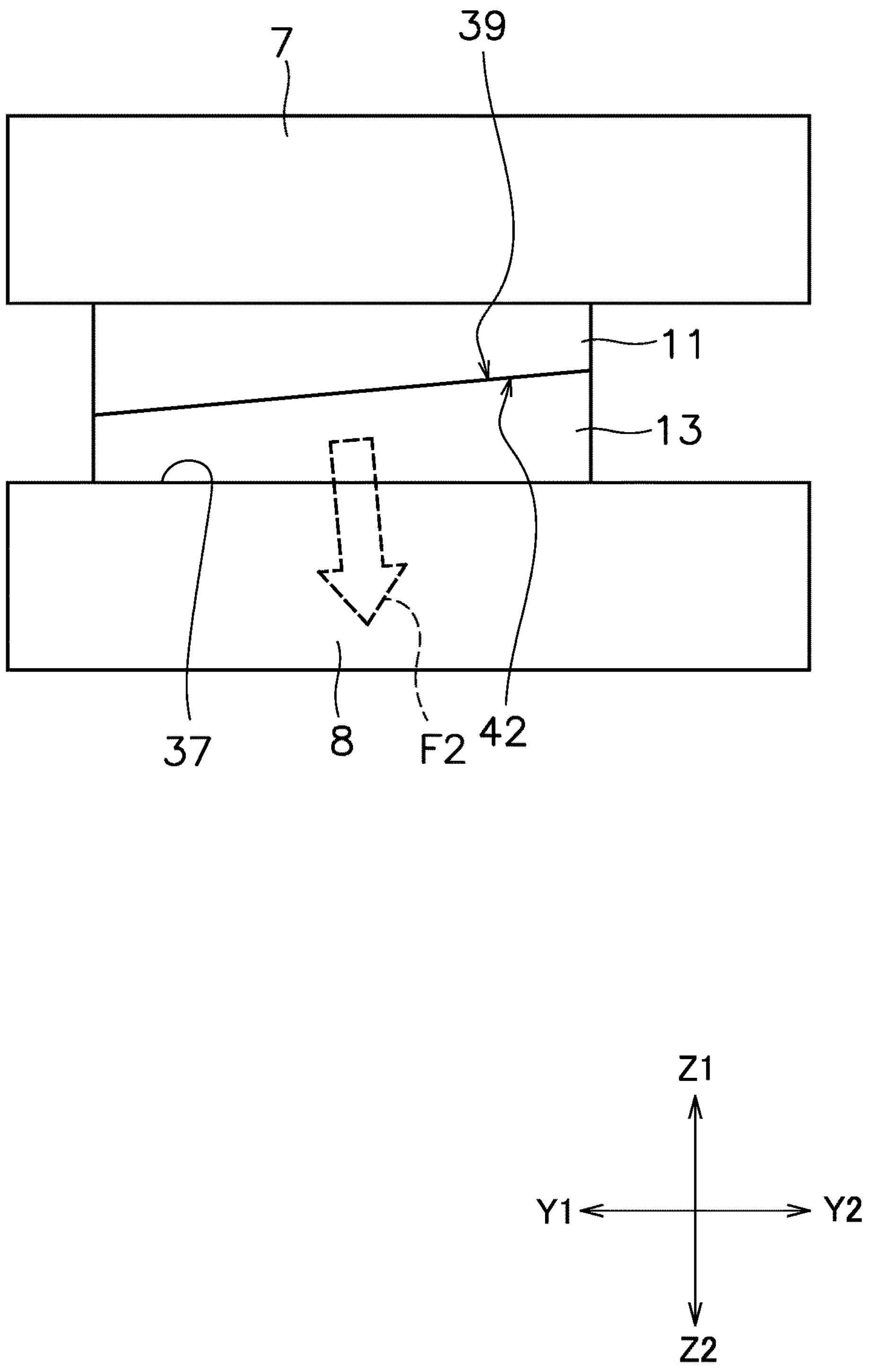
FIG. 12 is a right side view showing the contact device according to the sixth modification.

FIG. 11 is a left side view showing the contact device 3 according to a sixth modification. FIG. 12 is a right side view showing the contact device 3 according to the sixth modification. As shown in FIG. 11, the first movable contact 12 may include a first contact surface 38. The first contact surface 38 may be inclined with respect to the surface 37 of the movable piece 8. As shown in FIG. 12, the second movable contact 13 may include a second contact surface 39. The second contact surface 39 may be inclined with respect to the surface 37 of the movable piece 8.

The first fixed contact 10 may include a third contact surface 41. The third contact surface 41 may contact the first contact surface 38. The third contact surface 41 may be inclined in the same direction as the first contact surface 38. The second fixed contact 11 may include a fourth contact surface 42. The fourth contact surface 42 may contact the second contact surface 39. The fourth contact surface 42 may be inclined in the same direction as the second contact surface 39.

The first contact surface 38 and the second contact surface 39 may be inclined in opposite directions. Specifically, the first contact surface 38 may be inclined so that the height relative to the surface 37 of the movable piece 8 becomes lower toward the second lateral direction (Y2). The second contact surface 39 may be inclined so that the height relative to the surface 37 of the movable piece 8 becomes lower toward the first lateral direction (Y1).

In the movable piece 8 according to the sixth modification, since the first contact surface 38 and the second contact surface 39 are inclined, the repulsive forces F1 and F2 generated by the short-circuit current act on the movable piece 8 obliquely with respect to the moving direction (Z1, Z2) of the movable piece 8. Thereby, the repulsive force F1 in the separation direction (Z2) is reduced.

REFERENCE SIGNS LIST

4: Drive device, 6: First fixed terminal, 7: Second fixed terminal, 8: Movable piece, 10: First fixed contact, 11: Second fixed contact, 12: First movable contact, 13: Second movable contact, 14: Center portion, 15: Drive shaft, 31: First notch, 32: Second notch, 33: Third notch, 34: Fourth notch, 35: First recess, 36: Second recess, 38: First contact surface, 39: Second contact surface, Z1, Z2: Moving direction direction through the center portion.

The invention claimed is:

1. An electromagnetic relay comprising:

a drive shaft configured to move in a moving direction, the drive shaft extending in the moving direction;

a drive device configured to move the drive shaft in the moving direction;

a movable piece including a center portion connected to the drive shaft, the movable piece extending straight in a longitudinal direction from the center portion, the movable piece being a substantially flat plate-like member extending in the thickness, width and longitudinal directions;

a first fixed terminal facing the movable piece; and a second fixed terminal facing the movable piece, the second fixed terminal being disposed apart from the first fixed terminal in the longitudinal direction, wherein the movable piece includes a first contact portion configured to contact the first fixed terminal and a second contact portion configured to contact the second fixed terminal, the first and second contact portions being arranged on a same plane of the plate-like member, and the first contact portion is disposed eccentrically with respect to a center line of the movable piece, the center line extending in the longitudinal direction through the center portion.

2. The electromagnetic relay according to claim 1, wherein the second contact portion is disposed eccentrically with respect to the center line of the movable piece.

3. The electromagnetic relay according to claim 2, wherein the first contact portion and the second contact portion are eccentric to opposite sides each other with respect to the center line.

4. The electromagnetic relay according to claim 1, wherein the first contact portion and the second contact portion are disposed point-symmetrically with respect to the center portion.

5. The electromagnetic relay according to claim 1, wherein the movable piece includes a first notch disposed adjacent to the first contact portion.

6. The electromagnetic relay according to claim 5, wherein the movable piece includes a second notch disposed adjacent to the second contact portion.

7. The electromagnetic relay according to claim 6, wherein the first notch and the second notch are disposed point-symmetrically with respect to the center portion.

8. The electromagnetic relay according to claim 5, wherein the first fixed terminal includes a third notch disposed adjacent to the first notch.

9. The electromagnetic relay according to claim 6, wherein the second fixed terminal includes a fourth notch disposed adjacent to the second notch.

10. The electromagnetic relay according to claim 1, wherein the movable piece includes a first recess disposed adjacent to the first contact portion.

11. The electromagnetic relay according to claim 10, wherein the movable piece includes a second recess disposed adjacent to the second contact portion.

12. The electromagnetic relay according to claim 11, wherein the first recess and the second recess are disposed point-symmetrically with respect to the center portion.

13. The electromagnetic relay according to claim 1, wherein the first contact portion includes a first contact surface inclined with respect to a surface of the movable piece.

14. The electromagnetic relay according to claim 13, wherein the second contact portion includes a second contact surface inclined with respect to the surface of the movable piece.

15. The electromagnetic relay according to claim 14, wherein the first contact surface and the second contact surface are inclined in opposite directions from each other with respect to the center line.

* * * * *